United States Patent
Ratatics et al.

(10) Patent No.: US 10,838,438 B2
(45) Date of Patent: Nov. 17, 2020

(54) PRESSURE REGULATING VALVE FOR AN AIR SUPPLY SYSTEM OF A UTILITY VEHICLE

(71) Applicant: KNORR-BREMSE Systeme fuer Nutzfahrzeuge GmbH, Munich (DE)

(72) Inventors: Gabor Ratatics, Helvecia (HU); Peter Markos, Kecskemet (HU); Gergely Berczy, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 6 days.

(21) Appl. No.: 16/355,403

(22) Filed: Mar. 15, 2019

(65) Prior Publication Data
US 2019/0212757 A1 Jul. 11, 2019

Related U.S. Application Data

(63) Continuation of application No. PCT/EP2017/071061, filed on Aug. 21, 2017.

(30) Foreign Application Priority Data

Sep. 19, 2016 (DE) .......... 10 2016 117 607

(51) Int. Cl.
*G05D 16/10* (2006.01)
*B60T 17/04* (2006.01)
(Continued)

(52) U.S. Cl.
CPC .............. *G05D 16/10* (2013.01); *B60T 11/34* (2013.01); *B60T 17/00* (2013.01); *B60T 17/002* (2013.01);
(Continued)

(58) Field of Classification Search
CPC .......... B60T 1/34; B60T 17/00; B60T 17/002; B60T 17/04; F16K 31/1223;
(Continued)

(56) References Cited

U.S. PATENT DOCUMENTS 120,958 A * 11/1871 Garland ............... G05D 16/163
137/489.5
559,881 A * 5/1896 Ahrens ................ G05D 16/163
137/489.5
(Continued)

FOREIGN PATENT DOCUMENTS

DE    40 12 576 A1   10/1991
DE    42 34 626 A1    4/1994
(Continued)

OTHER PUBLICATIONS

International Preliminary Report on Patentability (PCT/IB/326 & PCT/IB/373) issued in PCT Application No. PCT/EP2017/071061 dated Mar. 28, 2019, including English translation of document C2 (German-language Written Opinion (PCT/ISA/237) previously filed on Mar. 15, 2019) (seven (7) pages).
(Continued)

*Primary Examiner* — William M McCalister
(74) *Attorney, Agent, or Firm* — Crowell & Moring LLP

(57) ABSTRACT

A pressure regulating valve for an air supply system of a utility vehicle includes a housing having at least one compressed air connection communicating with at least one first pressure regulating chamber. The pressure regulating chamber has a variable volume delimited by at least one wall section of the housing and a first active pneumatic surface of a pressure regulating piston. In first position of the pressure regulating piston a first regulating channel is not connected to the pressure regulating chamber, and a second position of the pressure regulating piston is connected to the pressure regulating chamber. The pressure regulating piston includes
(Continued)

a pin which rises out of the first active pneumatic surface of the pressure regulating piston. A second active pneumatic surface is located on an end of the pin. The pin is movably guided through the wall section in a pneumatically sealed manner.

14 Claims, 5 Drawing Sheets

(51) Int. Cl.
*B60T 11/34* (2006.01)
*F16K 31/122* (2006.01)
*B60T 17/00* (2006.01)

(52) U.S. Cl.
CPC .......... *B60T 17/04* (2013.01); *F16K 31/1223* (2013.01); *F16K 31/1221* (2013.01)

(58) Field of Classification Search
CPC .... F16K 31/1221; F16K 17/10; F16K 17/105; G05D 16/10; Y10T 137/7796; Y10T 137/7825; Y10T 137/7818; Y10T 137/7819; Y10T 137/7826; Y10T 137/7827; Y10T 137/7768
USPC ............ 137/505.13, 505.34, 505.35, 505.41, 137/505.42, 505.43, 489.5
See application file for complete search history.

(56) References Cited

U.S. PATENT DOCUMENTS

| | | | | |
|---|---|---|---|---|
| 833,062 | A * | 10/1906 | Krichbaum .......... | G05D 16/163 137/489.5 |
| 1,110,320 | A * | 9/1914 | Fulton .................... | F16K 17/10 137/488 |
| 1,173,834 | A * | 2/1916 | Metzger ................ | F16K 17/105 137/489.3 |
| 1,806,925 | A * | 5/1931 | Trapper .................. | F25B 49/00 417/298 |
| 2,304,323 | A * | 12/1942 | Wiegers ................ | G05D 16/10 251/28 |
| 2,573,231 | A * | 10/1951 | Teague, Jr. ............ | F16K 17/105 137/489.3 |
| 2,587,212 | A * | 2/1952 | Placette ................ | F16K 17/105 137/489.5 |
| 2,757,870 | A * | 8/1956 | Velan .................... | F24D 19/081 236/54 |
| 2,955,612 | A * | 10/1960 | Moser .................... | F16K 17/105 137/489.5 |
| 3,102,553 | A * | 9/1963 | Ottestad ................ | F16K 17/10 137/509 |
| 3,589,390 | A * | 6/1971 | Frantz .................... | F16K 17/105 137/489.5 |
| 3,972,345 | A * | 8/1976 | Court .................... | F04B 49/24 137/490 |
| 3,987,818 | A * | 10/1976 | Williams .............. | F01D 17/145 137/630.13 |
| 4,129,141 | A * | 12/1978 | Vogeli .................. | F16K 17/105 137/462 |
| 4,977,925 | A * | 12/1990 | Tiefenthaler .......... | F16K 17/105 137/489.5 |
| 5,275,202 | A * | 1/1994 | VanDeVyvere ......... | F16K 17/10 137/492 |
| 8,757,582 | B2 * | 6/2014 | Robinson ................ | F16K 24/04 251/25 |
| 10,047,872 | B2 * | 8/2018 | Shelly .................... | G05D 16/10 |
| 2006/0016492 | A1 | 1/2006 | Muller et al. | |
| 2008/0028923 | A1 | 2/2008 | Fujita et al. | |
| 2010/0186827 | A1 | 7/2010 | Ertl | |
| 2012/0248362 | A1 * | 10/2012 | Williamson ............. | F01M 1/16 251/321 |
| 2013/0276899 | A1 | 10/2013 | Frank et al. | |
| 2014/0014201 | A1 * | 1/2014 | Minato .................... | F16K 11/22 137/505 |
| 2014/0090726 | A1 * | 4/2014 | Hawkins ............ | G05D 16/0683 137/505.13 |
| 2015/0108720 | A1 * | 4/2015 | Seki ...................... | F01D 11/003 277/514 |
| 2015/0204204 | A1 * | 7/2015 | Seki ...................... | F16J 15/3208 415/230 |
| 2016/0281855 | A1 | 9/2016 | Didwiszus et al. | |

FOREIGN PATENT DOCUMENTS

| | | |
|---|---|---|
| DE | 43 44 416 A1 | 6/1995 |
| DE | 10 2004 020 268 A1 | 11/2005 |
| DE | 10 2005 057 004 B3 | 4/2007 |
| DE | 10 2008 053 994 A1 | 5/2010 |
| DE | 10 2008 063 819 A1 | 7/2010 |
| DE | 10 2010 028 404 A1 | 11/2011 |
| DE | 10 2010 051 812 A1 | 4/2012 |
| DE | 10 2013 005 711 A1 | 10/2014 |
| DE | 10 2015 203 962 A1 | 9/2016 |
| EP | 1 364 849 A2 | 11/2003 |
| EP | 2 444 291 A1 | 4/2012 |
| GB | 2 243 671 A | 11/1991 |
| JP | 52-148860 U | 11/1977 |
| JP | 2000-81146 A | 3/2000 |
| JP | 2004-183706 A | 7/2004 |
| JP | 2008-39074 A | 2/2008 |
| JP | 2012-215276 A | 11/2012 |
| JP | 2012-215277 A | 11/2012 |
| JP | 2015-155649 A | 8/2015 |
| WO | WO 2012/079698 A1 | 6/2012 |

OTHER PUBLICATIONS

International Search Report (PCT/ISA/210) issued in PCT Application No. PCT/EP2017/071061 dated Dec. 11, 2017 with English translation (five pages).
German-language Written Opinion (PCT/ISA/237) issued in PCT Application No. PCT/EP2017/071061 dated Dec. 11, 2017 (five pages).
German-language Office Action issued in counterpart German Application No. 10 2016 117 607.9 dated Feb. 13, 2017 (seven pages).
Japanese-language Office Action issued in Japanese Application No. 2019-515358 dated Mar. 9, 2020 with English translation (12 pages).

* cited by examiner

PRESSURE REGULATING VALVE FOR AN AIR SUPPLY SYSTEM OF A UTILITY VEHICLE

CROSS REFERENCE TO RELATED APPLICATIONS

This application is a continuation of PCT International Application No. PCT/EP2017/071061, filed Aug. 21, 2017, which claims priority under 35 U.S.C. § 119 from German Patent Application No. 10 2016 117 607.9, filed Sep. 19, 2016, the entire disclosures of which are herein expressly incorporated by reference.

BACKGROUND AND SUMMARY OF THE INVENTION

The present invention concerns a pressure regulating valve for an air supply system of a utility vehicle comprising a pressure regulating piston that comprises a spigot protruding from an effective pneumatic area of the pressure regulating piston and on the end of which there is a second effective pneumatic area.

A number of pressure regulating valves for air supply systems of a utility vehicle are already known from the prior art. However, said pressure regulating valves comprise a high system complexity and many valve elements that move relative to each other and that are to be sealed relative to each other.

Thus for example, DE 42 34 626 (A1), in particular in FIG. 2, reveals a pressure-controlled valve, a pressure regulating valve for pneumatic suspension systems of utility vehicles.

Furthermore, DE 10 2005 057 004 (B3) reveals a pressure regulating valve 20 for a pressure supply device 10 for a utility vehicle.

Other generic pressure regulating valve devices are disclosed in DE 40 12 576 (A1), DE 10 2008 063 819 (A1), DE 10 2008 053 994 (A1), EP 1 364 849 (A2) and DE 43 44 416 (A1).

Furthermore, EP 2 444 291 (A1) reveals a service brake valve of a pneumatic or electropneumatic vehicle brake system.

It is therefore the object of the present invention to advantageously further develop a pressure regulating valve for an air supply system of a utility vehicle of the aforementioned type, in particular in respect of the fact that the structural design thereof is simplified and thereby fewer parts are necessary.

This object is achieved according to the invention by a pressure regulating valve for an air supply system of a utility vehicle, the pressure regulating valve being provided with a housing, with at least one compressed air port and with at least one first pressure regulating chamber into which the pressure port opens, wherein the pressure regulating chamber has a variable volume bounded by at least one wall section of the housing and a first effective pneumatic area of a pressure regulating piston that is movably guided in the housing. Furthermore, a first regulating channel is provided, which is not connected to the pressure regulating chamber when the pressure regulating piston is in at least one first position and is connected to the pressure regulating chamber when the pressure regulating piston is in at least one second position. The pressure regulating piston comprises a spigot protruding from the first effective pneumatic area of the pressure regulating piston and on the end of which there is a second effective pneumatic area, wherein the spigot is movably guided through the wall section in a pneumatically sealed manner.

The invention is based on the basic idea of arranging the first regulating channel, which connects the pressure regulating chamber to the discharge valve chamber via a housing chamber and a second regulating channel, within the pressure regulating valve housing and of passing the spigot of the pressure regulating piston in a pneumatically sealed manner through a centrally disposed wall section of the housing. Due to the arrangement of the first regulating channel on the housing side, passing the same through moving valve elements (such as for example the pressure regulating piston) can be omitted. As a result, the sealing of the pressure regulating piston or the spigot is considerably simplified and at least one sealing device can be dispensed with. Moreover, by movably passing the spigot through the wall section of the housing an additional second effective pneumatic area of the pressure regulating piston on the end face of the spigot can be provided, which has a working connection to the discharge valve chamber. Because of this structural design of the pressure regulating piston, which is connected by means of the first effective pneumatic area thereof to the pressure regulating chamber and correspondingly by means of the second effective pneumatic area thereof to the discharge valve chamber, a sufficiently large pressure regulating valve hysteresis can be provided. Thus, defined and reliable pressure regulation can be guaranteed for any operating state of the pressure regulating valve.

In this context, it is further conceivable that the first effective pneumatic area and the second effective pneumatic area are disposed on the same side of the pressure regulating piston. By means of this arrangement of the first and second effective pneumatic areas, the pressure regulating chamber and the discharge valve chamber can be disposed adjacent to each other within the common housing in a very space-saving manner, only by the wall section through which the spigot is passed.

Furthermore, it can be provided that the first effective pneumatic area and the second effective pneumatic area have the same orientation. The orientation can be carried out essentially in a common plane. This results in a defined pressure force distribution on the first and second effective pneumatic areas of the pressure regulating piston.

It can further be provided that the second effective pneumatic area of the pressure regulating piston protrudes into a discharge valve chamber. This structural arrangement gives in particular the possibility of arranging the pressure regulating piston and the relief valve piston essentially coaxial to each other in the housing, resulting in a very compact housing of the pressure regulating valve and relief valve. Furthermore, because of the protrusion the length of the spigot is extended, whereby the wear between the seal of the wall section and the spigot is significantly reduced, because the sharp circumferential edge of the second effective pneumatic area of the spigot does not come into contact with the seal of the wall section during the axial movement of the spigot. A further advantage of the extended spigot is the more accurate axial guidance of the spigot and the pressure regulating piston within the associated wall section during axial movement.

Furthermore, it can be conceivable that the pressure regulating piston comprises a radial outer surface in which venting channels or ventilation channels and guide surfaces are disposed. The venting channels or ventilation channels are imperative for a definite fulfillment of the function of the pressure regulating valve. This is because they ensure reliable venting of the discharge valve chamber when the pressure regulating piston is in a first position. However, this venting function only results when the pressure regulating piston is in the first position, because the seal of the pressure regulating piston seals a connection between the venting channels or ventilation channels and the first regulating channel from a sufficiently large axial displacement. Because of the guide surfaces of the pressure regulating piston, precise axial guidance of the pressure regulating piston within the associated wall section can be achieved with correctly implemented tolerances of the guide surfaces and the associated wall section.

It is further conceivable that the pneumatic sealing is embodied by a sealing ring, in particular an O-ring or a vulcanized sealing ring. Rubber-based O-rings form a reliable sealing option for mutually relatively moving pairs of effective areas in compressed air valves of all types that has been proven many times. Due to the vulcanization of such a sealing ring on the outer jacket surface of the pressure regulating piston for example, a further increase of the functional reliability and simplification of the manufacture of the pressure regulating piston can be achieved, because in this case the joint between the sealing ring and the pressure regulating piston is not achieved by a groove that is provided for this purpose, but by a solid connection of the two components.

Furthermore, it can be provided that a multi-part seal is provided between the wall of the pressure regulating chamber, which is formed by the housing, and the pressure regulating piston. In particular, if for example the pressure regulating piston moves from the first position to the second position due to the axial movement thereof, during each change of position the seal of the pressure regulating piston passes over the opening of the first regulating channel, which opens into the housing wall of the pressure regulating chamber. The regular transition of the first regulating channel across the opening disposed in the wall section produces increased wear on the seal of the pressure regulating piston. Therefore, besides the primary function associated therewith, namely the sealing of the pressure regulating piston and the associated wall section of the housing, the seal must also additionally fulfill the secondary function of increasing the wear resistance. For the combination of the primary and secondary function, it can be especially advantageous in the sense of the increase in the operating reliability of the pressure regulating valve to implement the sealing of the pressure regulating piston and the wall section by a multi-part seal.

In this context, it can in particular be provided that the multi-part seal comprises at least one outer ring and one inner ring. In order to counteract the increased wear and at the same time still not unnecessarily increase the complexity of the multi-part seal, a two-part seal offers a very good compromise in this respect. Thus for example, the outer ring of the two-part seal is formed from a more wear-resistant material than the inner ring of the multi-part seal. Because of the elasticity thereof, the latter is primarily responsible in this combination for an adequate contact force of the outer sealing ring on the corresponding wall section.

Furthermore, it can be provided that the outer ring is a hard sealing ring and that the inner ring is a rubber-type sealing ring, in particular wherein the hard sealing ring is a Teflon and/or plastic ring and in particular wherein the inner ring is an O-ring, for example a silicon or rubber O-ring. The use of a Teflon and/or plastic ring can, in addition to an advantageous sealing effect and wear resistance, additionally achieve a reduction of the friction between the surface of the outer ring and the associated wall section of the housing. The silicon or rubber O-ring is primarily used because of the elastic properties thereof to press the outer ring against the corresponding wall section of the housing with a sufficiently large contact force to achieve the sealing effect.

Furthermore, in this context it can be conceivable that the pressure regulating piston comprises a radial groove, in which the multi-part seal is guided. Due to the provision of the radial groove on the jacket surface of the pressure regulating piston, the multi-part seal can reliably contact the wall section, in particular during the transition across the opening of the first regulating channel disposed in the wall section, and can thus contribute to the increase in the operating reliability of the pressure regulating valve.

Moreover, it can be provided that the radial groove comprises a pneumatic connection in the base of the groove, so that a pneumatic connection can be made between the pressure regulating chamber and the radial groove. Because of the pneumatic connection between the base of the groove and the pressure regulating chamber, the seal of the pressure regulating piston can be subjected to compressed air, so that the sealing effect is further increased because of the resulting higher contact force of the seal on the wall section, which results in an additional positive influence on the functional reliability of the pressure regulating valve.

In particular, it can be provided that the pneumatic connection is disposed such that with the pressure regulating valve in the fitted and operationally ready state, the multi-part seal can be forced radially outwards by the pressure from the pressure regulating chamber. In addition to the improvement of the sealing effect, said pneumatic connection has proven itself especially advantageous when the elastic inner ring of the multi-part seal can no longer exert the full contact force on the outer ring with time because of the unavoidable ageing of the elastic rubber or silicon material.

Furthermore, it is conceivable that the pressure regulating piston is embodied in one piece. In addition to the reduced number of parts, a one-piece pressure regulating piston can be manufactured more easily and inexpensively and also has higher mechanical stiffness.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
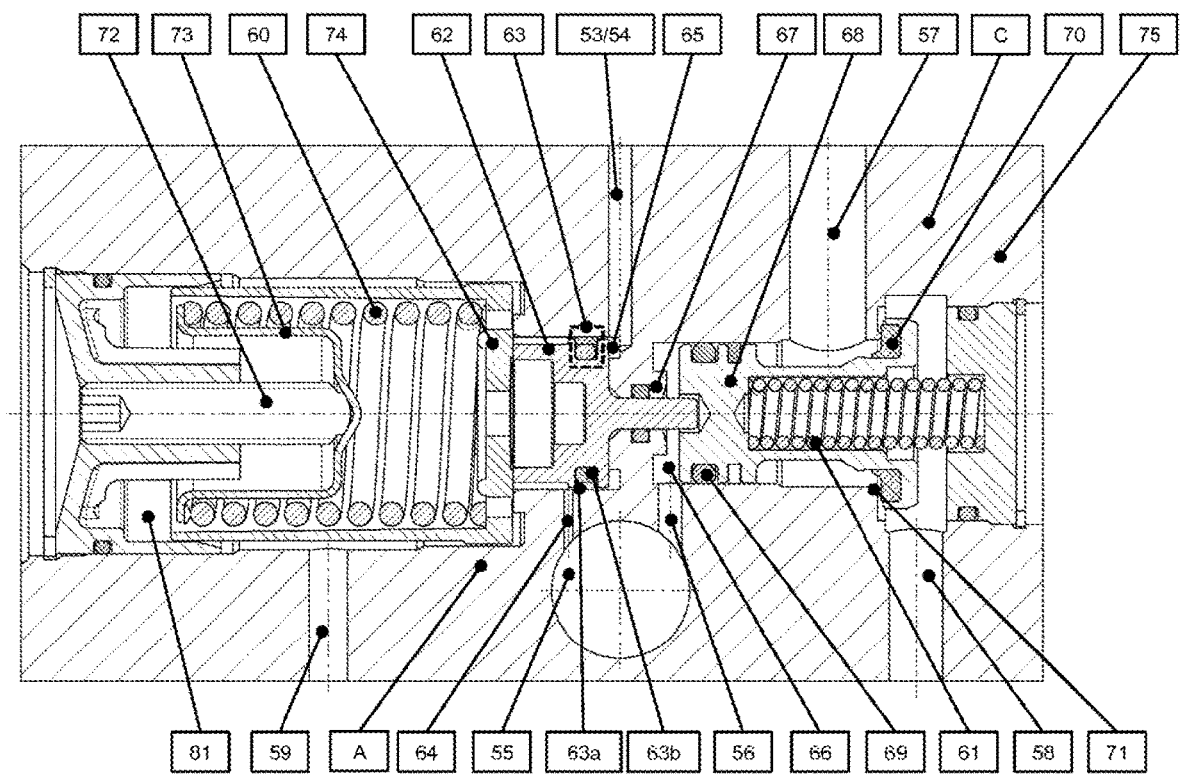
FIG. 1 shows a schematic cross-sectional view of an embodiment of an arrangement of a pressure regulating valve according to the invention and a relief valve according to the invention in a common housing.
Figure 5:
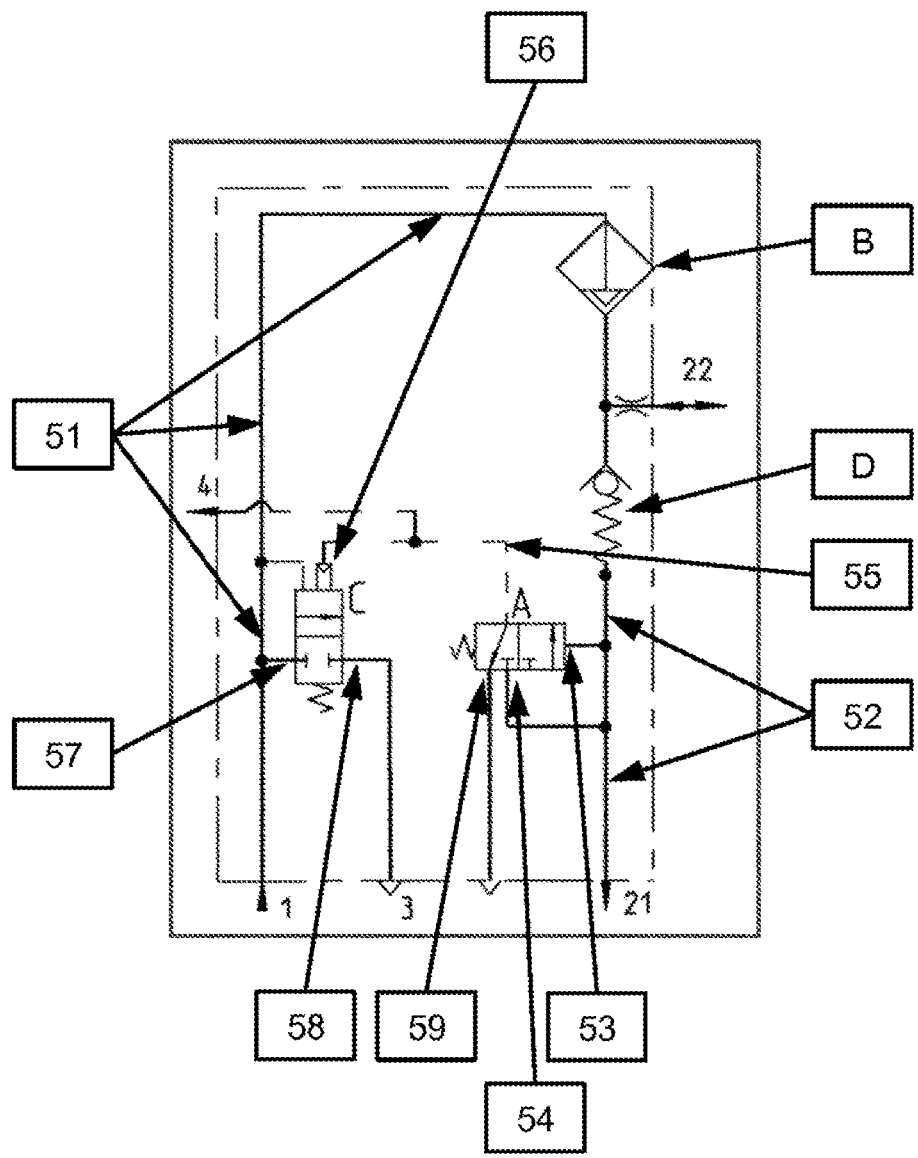
FIG. 5 shows a pneumatic circuit of the pressure regulating valve and the relief valve according to FIG. 1 within an embodiment of an air supply system according to the invention.

FIG. 1 shows a schematic cross-sectional view of an exemplary embodiment of an arrangement of a pressure regulating valve A according to the invention and a relief valve C according to the invention in a common housing 75 (cf. also FIG. 5).

The pressure regulating valve A for an air supply system of a utility vehicle comprises a compressed air port 53, 54 in addition to a housing 75. The compressed air port 53, 54 is provided in this case as a radial bore within the housing 75.

Furthermore, the pressure regulating valve comprises a first pressure regulating chamber 65, into which the pressure port 53, 54 opens. The pressure regulating chamber 65 is essentially formed as an annular chamber in the housing 75, the central axis of which is oriented coaxially with the central axis of the housing 75.

The pressure regulating chamber 65 further comprises a variable volume. The volume of the pressure regulating chamber is bounded by a wall section of the housing 75 and a first effective pneumatic area 78 of a pressure regulating piston 62 that is movably guided in the housing 75. The aforementioned wall section of the housing 75 can be seen according to FIG. 1 as the wall section within which the radial outer surface of the pressure regulating piston 62 (and the spigot 79) are guided.

Consequently, the pressure regulating piston 62 further comprises a spigot 79 protruding from the first effective pneumatic area 78 of the pressure regulating piston 62. In addition, the pressure regulating piston 62 is formed in one piece. At the end of the spigot 79 (cf. FIG. 2) there is a second effective pneumatic area 80.

Furthermore, the first effective pneumatic area 78 and the second effective pneumatic area 80 are disposed on the same side of the pressure regulating piston 62. According to FIG. 1, moreover, the first effective pneumatic area 78 and the second effective pneumatic area 80 have the same orientation. They are essentially disposed in a coplanar manner.

In addition, the spigot 79 is movably guided through the wall section in a pneumatically sealed manner. Within the wall section, the spigot 79 is pneumatically sealed by means of a sealing ring 67 disposed in the housing section. The pneumatic seal by a sealing ring 67 is formed by means of an O-ring according to FIG. 1.

Furthermore, a multi-part seal 63 is provided between the wall of the pressure regulating chamber 65, which is formed by the housing 75, and the pressure regulating piston 62. Said multi-part seal consists essentially of an inner ring 63b and an outer ring 63a. The multi-part seal can however also comprise more than two sealing rings. However, the pneumatic seal can also be formed by means of a vulcanized sealing ring or other current seals. This also applies to all other seals that are described herein.

The pressure regulating valve A further comprises a spring receiving pot 74 that is movably guided in the housing 75. The end of the spring receiving pot 74 facing the pressure regulating piston 62 in the fitted state of the pressure regulating valve A makes planar contact with the end of the pressure regulating piston 62 that in turn is facing the spring receiving pot 74.

A spring 60 is disposed within the spring receiving pot 74. A first end of the spring 60 is supported axially and radially in the vicinity of the open end of the spring receiving pot 74 by means of a spring plate 73. The spring 60 extends further within the spring receiving pot 74 up to the second end thereof, which is axially and radially supported on a receptacle provided in the spring receiving pot 74.

In a central position on the spring plate 73, this is further connected to an adjusting screw 72. The adjusting screw 72 is screwed centrally into a housing insert that is fastened axially in the housing 75 by means of a securing ring.

A spring chamber 81 is additionally provided in the housing insert that is bounded by the internal structure of the housing insert and the open end of the spring receiving pot 74. Furthermore, the housing insert comprises an inner annular surface at which the open end of the spring receiving pot 74 can be stopped.

Moreover, the pressure regulating valve A comprises a venting port 59, which extends in the form of a bore radially and essentially perpendicular to the central axis of the housing 75 from the outside thereof to the housing bore for receiving the spring receiving pot 74.

The spring 60 is implemented as a coil spring in the present exemplary embodiment. The design of the spring 60 is however not limited to the shape of a coil spring, but can be replaced by any elastic element that is familiar to a person skilled in the art in this context.

Furthermore, a first regulating channel 64 is provided in the pressure regulating valve A. The first regulating channel 64 is disposed in the housing 75 and opens by means of an opening into the wall section in which the pressure regulating piston 62 is movably guided. The regulating channel 64 also extends essentially perpendicularly to the central axis of the housing 75 and also opens into a housing chamber 55.

The housing chamber 55 is (cf. FIG. 1) the structural interface between the pressure regulating valve A and the relief valve C. in the present embodiment, the pressure regulating valve A and the relief valve C divide the common housing 75. However, this structural design represents only one of a number of possibilities for combining the pressure regulating valve A and the relief valve C with each other. A second regulating channel 56 extends from the housing chamber 55 to a discharge valve chamber 66 of the relief valve C.

In this context, it is for example also possible to dispose the pressure regulating valve A and the relief valve C within separate housings and accordingly to connect both valves via the housing chamber 55 and the second effective pneumatic area 80 to the discharge valve chamber 66 of the relief valve C (cf. also FIG. 5).

In FIG. 1 it can be seen that the second effective pneumatic area 80 of the pressure regulating piston 62 protrudes into a discharge valve chamber 66. The spigot 79 protrudes further into a corresponding opening of a relief valve piston 68, which bounds the discharge valve chamber 66 in addition to an axial receiving bore disposed centrally in the housing 75. The relief valve piston 68 is movably guided within the centrally disposed axial receiving bore of the housing 75. Furthermore, the relief valve piston 68 is sealed with respect to the discharge valve chamber 66 by means a sealing ring 69.

The end of the relief valve piston 68 facing away from the spigot 79 forms a valve seat 71 together with a corresponding housing protrusion at the end of the centrally disposed axial receiving bore. For sealing the valve seat 71, a sealing plate 70 is also provided that is disposed in the aforementioned end of the relief valve piston 68 in a corresponding molding.

Furthermore, in the interior of the relief valve piston 68 there is a spring 61 that extends at least partly within the relief valve piston 68 up to a further housing insert that bounds and axially and radially supports said spring 61.

Furthermore, the housing 75 comprises a radially disposed inlet port 57 in the vicinity of the relief valve C (cf. FIG. 5). The inlet port 57 extends radially from the outside of the housing 75 essentially perpendicularly to the center line thereof up to the central axially disposed receiving bore, in which the relief valve piston 68 is movably guided.

The housing 75 further comprises a radially disposed outlet port 58 in the vicinity of the relief valve C.

Figure 2:
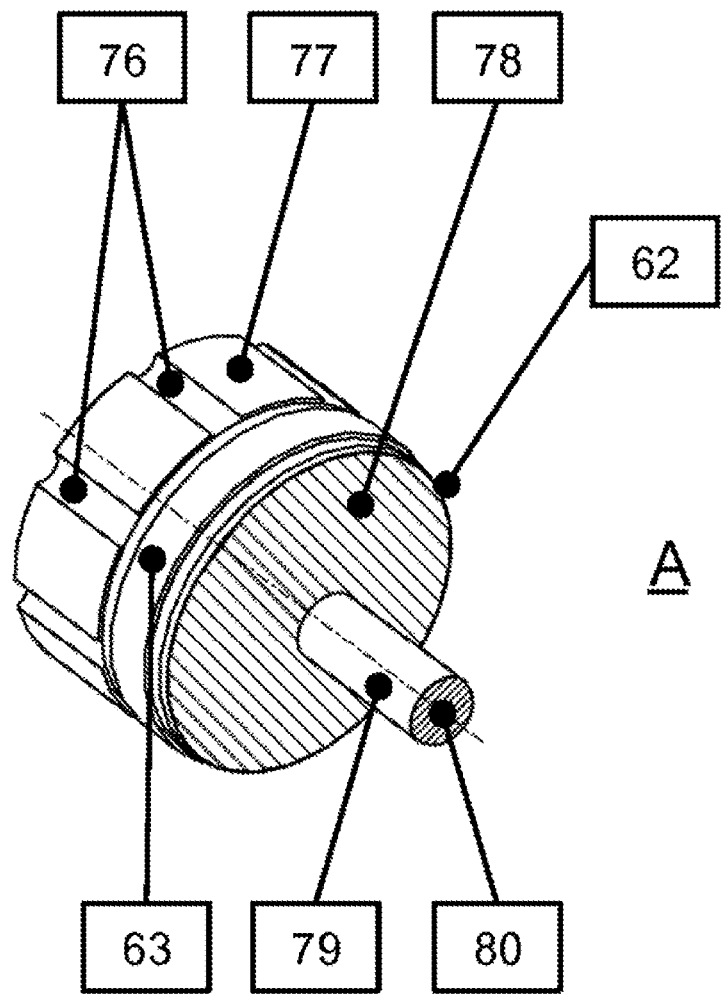
FIG. 2 shows a schematic perspective view of a first embodiment of a pressure regulating piston according to the invention of the pressure regulating valve.

FIG. 2 further shows a schematic perspective view of a first exemplary embodiment of a pressure regulating piston according to the invention 62 of the pressure regulating valve A (cf. also FIG. 5).

As already described above, the pressure regulating piston 62 comprises a multi-part seal 63 and a spigot 79 protruding from the first effective pneumatic area 78 of the pressure regulating piston 62 and on the end of which there is a second effective pneumatic area 80.

The pressure regulating piston 62 also comprises a radial outer surface in which ventilation channels 76 are disposed. The ventilation channels 76 are distributed angularly uniformly in the radial outer surface. Furthermore, the ventilation channels 76 each extend axially from the end of the pressure regulating piston 62 facing the spring receiving pot 74 approximately as far as the multi-part seal 63.

Furthermore, guide surfaces 77 are disposed in the radial outer surface of the pressure regulating piston 62. The guide surfaces 77 are also distributed angularly evenly in the radial outer surface and are disposed adjacent to the venting channels 76. The guide surfaces 77 extend axially essentially the same as the ventilation channels 76.

Figure 3:
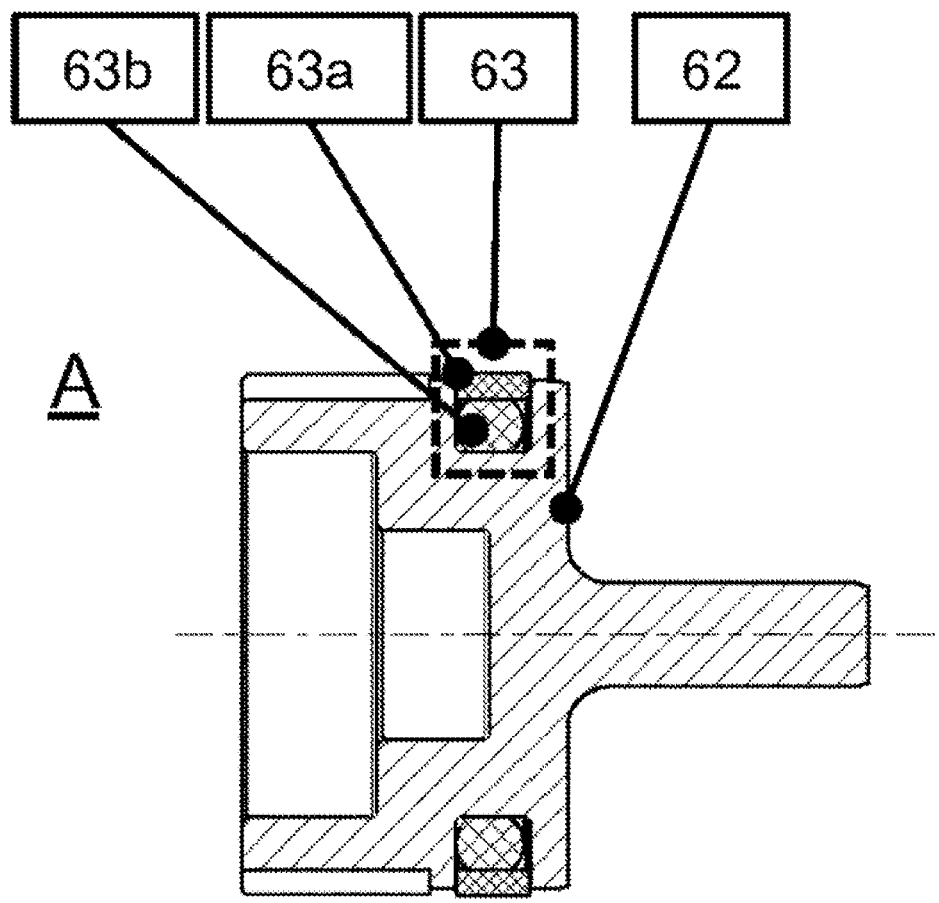
FIG. 3 shows a schematic cross-sectional view of the first embodiment of the pressure regulating piston of the pressure regulating valve.

FIG. 3 shows a schematic cross-sectional view of the first embodiment of the pressure regulating piston 62 according to FIGS. 1 and 2.

The pressure regulating piston 62 comprises a multi-part seal 63 comprising an outer ring 63*a* and an inner ring 63*b*. The pressure regulating piston 62 also comprises a radial groove, in which the multi-part seal 63 is guided. The multi-part seal 63 can also consist of more than two sealing rings.

In this case the outer ring 63*a* is a hard sealing ring. The hard sealing ring is embodied as a Teflon ring or a plastic ring. Alternatively, the hard sealing ring can also be embodied as a Teflon-coated plastic ring. Further known hard sealing ring materials or combinations thereof that are known to the person skilled in the art can also be used in this context.

The inner ring 63*b* is by contrast a rubber-type sealing ring. In this respect it is conceivable that the inner ring 63*b* is an O-ring. Materials of the inner ring 63*b* can be silicon or rubber. Other known elastic materials that are known to the person skilled in the art can also be used in this context.

Figure 4:
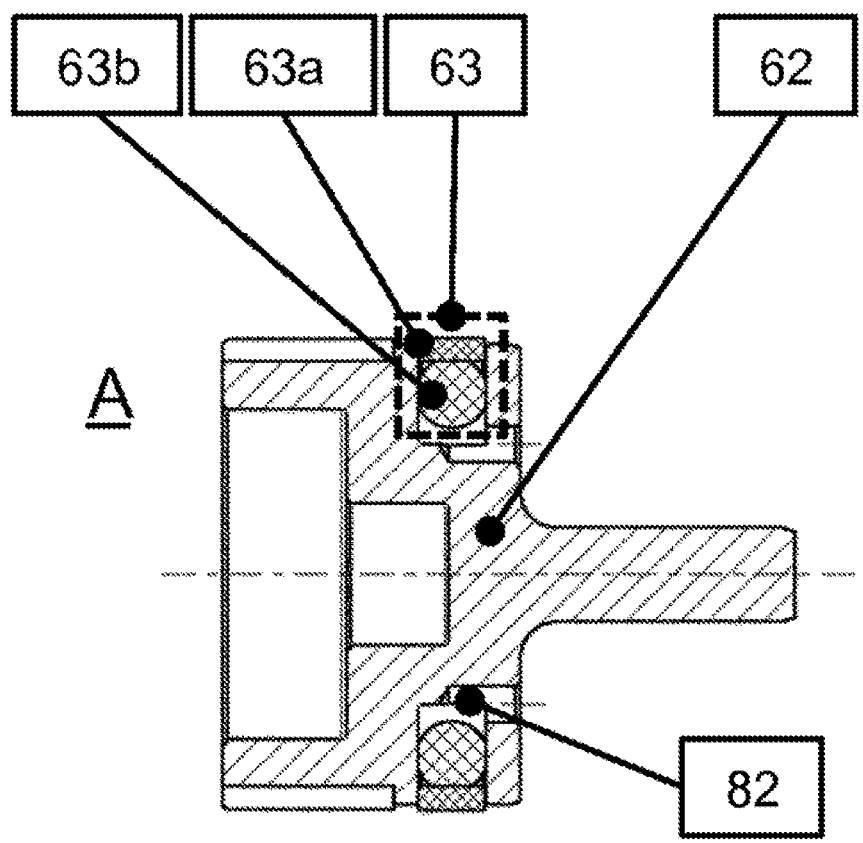
FIG. 4 shows a schematic cross-sectional view of a second embodiment of a pressure regulating piston according to the invention of the pressure regulating valve.

FIG. 4 shows a schematic cross-sectional view of a second embodiment of a pressure regulating piston 12 according to the invention of the pressure regulating valve A (cf. also FIG. 5).

The pressure regulating piston 12 comprises essentially the same structural features as the pressure regulating piston 12 shown in FIGS. 1, 2 and 3, apart from the structural differences that are shown below.

The radial groove of the pressure regulating piston 12 comprises a pneumatic connection in the base of the groove. The pneumatic connection is disposed such that in the fitted and operationally ready state of the pressure regulating valve A the multi-part seal 63 can be forced radially outwards by the pressure from the pressure regulating chamber 65. The pneumatic connection between the base of the groove and the pressure regulating chamber 65 can be made through a pressure regulating piston bore 82, for example. A plurality of pressure regulating piston bores 82 or other shapes are also conceivable.

FIG. 5 shows a pneumatic circuit of the pressure regulating valve A and the relief valve C according to FIG. 1 in an embodiment of an air supply system according to the invention.

The air supply system according to FIG. 5 comprises the pressure regulating valve A and the relief valve C. Furthermore, the air supply system comprises an air dryer B (for example in the form of an air dryer cartridge) and a non-return valve D.

Furthermore, the air supply system comprises a compressor port 1, by means of which compressed air is supplied from a compressor that is not represented in FIG. 5. A first outlet port 21 of the air supply system is also provided on the air supply system. The first outlet port 21 of the air supply system is connected to the usual compressed air consumers in the utility vehicle such as for example the multi-circuit protection valve.

The compressor port 1 is connected to the air dryer B via an inlet line 51 of the air dryer B. The outlet of the air dryer B is connected via an outlet line 52 to the first outlet port 21 of the air supply system downstream of the air dryer B. The non-return valve D is disposed downstream of the outlet of the air dryer B in the outlet line 52 thereof.

The inlet line 51 of the air dryer B branches upstream of the air dryer B, whereby the inlet port 57 of the relief valve C is connected to the inlet line 51 of the air dryer B. The relief valve C is also connected to a primary venting port 3 of the air supply system via the outlet port 58 of the relief valve C.

Furthermore, a second outlet or inlet port 22 branches downstream of the air dryer B between the outlet thereof and the non-return valve D.

Furthermore, the outlet line 52 of the air dryer B branches downstream of the non-return valve D, whereby the compressed air port 53, 54 of the pressure regulating valve A is connected to the outlet line 52 of the air dryer B. Furthermore, the pressure regulating valve A comprises a venting port 59 that is connected to a further venting port of the air supply system.

As already described above, the pressure regulating valve A comprises a first regulating channel 64 (cf. FIG. 1), by means of which the housing chamber 55 can be connected to the pressure regulating chamber 65 (cf. FIG. 1 also). The housing chamber 55 is in turn connected via a second regulating channel 56 to the discharge valve chamber 66 of the relief valve C (cf. FIG. 1 also). A compressor control port 4, by means of which the housing chamber 55 can be connected to a control input of a compressor that is not represented in FIG. 5, can also branch off from the housing chamber 55.

The function of the pressure regulating valve A can now be described as follows:

Compressed air first flows via the compressor port 1 through the inlet line 51 to the air dryer B (cf. FIG. 5 for this), flows through the air dryer B and thereupon flows through the non-return valve D and exits the air supply system via the first outlet port 21 thereof. Downstream of the outlet port 21, the usual compressed air consumers in the utility vehicle are supplied with compressed air. Furthermore, the compressed air port 53, 54 of the pressure regulating valve A and the inlet port 57 of the relief valve C are supplied with compressed air.

The compressed air arriving at the compressed air port 53, 54 of the pressure regulating valve A also flows into the pressure regulating chamber 65 and also pressurizes the pressure regulating chamber 65 with compressed air. If the pressure in the pressure regulating chamber 65 increases further, an axial displacement of the pressure regulating piston 62 takes place starting from the first position thereof into a second position. During the transition of the pressure regulating piston 65 from the first position into the second position, the multi-part seal 63 of the pressure regulating piston 62 passes over the opening of the first regulating channel 64. Consequently, the first regulating channel 64 is connected to the pressure regulating chamber 65 when the pressure regulating piston 62 is in the second position. The so-called cut-off pressure of the pressure regulating valve A is thus reached.

The compressed air can thus flow from the pressure regulating chamber 65 via the first regulating channel 64, the housing chamber 55 and the second regulating channel 56 into the discharge valve chamber 66. There the pressurized discharge valve chamber 66 thereupon pressurizes the relief valve piston 68 essentially with the same pressure as prevails in the pressure regulating chamber 65.

If the pressure force acting on the relief valve piston 68 exceeds the force of the spring 61 acting in the opposite direction to this, the relief valve piston 68 is axially displaced. Consequently, the valve seat 71 opens, whereby the inlet port 57 and the outlet port 58 of the relief valve C are now connected to each other. The connection of the inlet port 57 and the outlet port 58 has the result that the inlet line 51 of the air dryer B is vented via the primary venting port 3 of the air supply system that is connected to the outlet port 58. As a result, all the compressed air supplied via the compressor port 1 as previously described vents via the primary venting port 3 and the ventilation of the air supply system is interrupted. If the housing chamber 55 is additionally connected to a compressor control port 4, this is also pressurized with the cut-off pressure. The cut-off pressure can for example be transferred directly to a control unit of the compressor as a control pressure or can be converted into an electrical control signal by means of a pressure sensor. In response to the control pressure or the electrical control signal, the operation of the compressor can be stopped or continued with reduced power until the air supply system has to be supplied with compressed air again.

Because of the venting of the inlet line 51 and the temporary stoppage or power reduction of the compressor, the pressure also falls in the outlet line 52 of the air dryer B and in the first outlet port 21. As the compressed air port 53, 54 of the pressure regulating valve is connected to the outlet line 52, the pressure consequently also reduces in the pressure regulating chamber 65 of the pressure regulating valve A and in the first regulating channel 64, the housing chamber 55, the second regulating channel 56 and the discharge valve chamber 66.

If the pressure within the pressure regulating chamber 65 reduces continuously, because of the now greater force of the spring the pressure regulating piston 62 moves 60 from the second position back into the first position thereof. In this case the multi-part seal 63 of the pressure regulating piston 62 again passes over the first regulating channel 64. The first regulating channel 64 is consequently not connected to the pressure regulating chamber 65 with the pressure regulating piston 62 in the first position. The so-called switch-on pressure of the pressure regulating valve A is thus reached.

Once the multi-part seal 63 of the pressure regulating piston 65 passes over the first regulating channel 64, the discharge valve chamber 66 is vented via the second regulating channel 56, the housing chamber 55, the first regulating channel 64, the ventilation channels 76 of the pressure regulating piston 65 and the venting port 59 of the pressure regulating valve A connected thereto.

If due to said venting the pressure within the discharge valve chamber 66 reduces insofar that the force of the spring 61 exceeds the pressure force within the discharge valve chamber 66, the relief valve piston moves back until the valve seat 71 is closed. The inlet port 57 and the outlet port 58 of the relief valve A are now separated from each other again, so that no further decrease in pressure can occur within the air supply system. Furthermore, the compressor control port 4 is also vented, whereby the operation of the compressor can be resumed again for example.

In summary, it can also be stated that because of the previously described functionality of the pressure regulating valve A, an outlet pressure at the first outlet port 21 of the air supply system can only lie within a range between the switch-on pressure and the cut-off pressure of the pressure regulating valve A.

As already described previously, the pressure regulating piston 62 comprises a spigot 79 with a second effective pneumatic area 80, which protrudes in a pneumatically sealed manner into the discharge valve chamber (cf. FIG. 1). However, the spigot 79 does not necessarily have to protrude into the discharge valve chamber 66. For proper fulfillment of the function thereof, it is necessary that the second effective pneumatic area 80 of the spigot 79 is connected to the discharge valve chamber 66 (for example via a separate port if the pressure regulating valve A and the relief valve C do not have a common housing 75).

Due to the connection of the pressure regulating piston 62 to both the pressure regulating chamber 65 and the discharge valve chamber 66 via the spigot 79, the hysteresis of the pressure regulating valve A is increased, whereby the control properties thereof improve significantly. Furthermore, the opening characteristic or the closing characteristic of the pressure regulating valve A and the relief valve C can be adjusted by means of the ratio of the diameters of the first and second regulating channels 64, 56 and by means of the diameter of the housing chamber 55.

REFERENCE CHARACTER LIST 1 compressor port
3 primary venting port of the air supply system
4 compressor control port of the air supply system
21 first outlet port of the air supply system
22 second outlet or inlet port of the air supply system
51 inlet line of the air dryer
52 outlet line of the air dryer
52 compressed air port
54 compressed air port
55 housing chamber
56 second regulating channel
57 inlet port of the relief valve
58 outlet port of the relief valve
59 venting port of the pressure regulating valve
60 spring of the pressure regulating valve
61 spring of the relief valve
62 pressure regulating piston
63 multi-part seal
63a outer ring of the multi-part seal
63b inner ring of the multi-part seal
64 first regulating channel
65 pressure regulating chamber
66 discharge valve chamber 67 sealing ring
68 relief valve piston
69 sealing ring of the relief valve piston
70 sealing plate of the relief valve piston
71 valve seat of the relief valve
72 adjusting screw of the pressure regulating valve
73 spring plate of the pressure regulating valve
74 spring receiving pot of the pressure regulating valve
75 housing
76 ventilation channels or venting channels
77 guide surfaces
78 first effective pneumatic area
79 spigot
80 second effective pneumatic area
81 spring chamber of the pressure regulating valve
82 pressure regulating piston bore
A pressure regulating valve
B air dryer
C relief valve
D non-return valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure regulating valve for an air supply system of a utility vehicle, comprising:
   a housing, the housing including at least one compressed air port, and a first regulating channel and at least one first pressure regulating chamber in fluid communication with the pressure port, the pressure regulating chamber having a variable volume bounded by at least one wall section of the housing;
   a pressure regulating piston configured to be movably guided in the housing, the pressure regulating piston having a first effective pneumatic area, the pressure regulating piston being configured such that the first regulating channel is not in fluid communication with the at least one first pressure regulating chamber when the pressure regulating piston is in at least one first position and to be in fluid communication with the at least one first pressure regulating chamber when the pressure regulating piston is in at least one second position, and
   a spigot protruding from the first effective pneumatic area of the pressure regulating piston, the spigot having at an end a second effective pneumatic area,
   wherein
   the spigot configured to be movably guided through the wall section of the housing through a pneumatic seal,
   the second effective pneumatic area of the pressure regulating piston protrudes into a discharge valve chamber, and
   the pressure regulating chamber is in fluid communication with the discharge valve chamber via the first regulating channel, when the pressure regulating piston is in the second position.

2. The pressure regulating valve as claimed in claim 1, wherein
   the first effective pneumatic area and the second effective pneumatic area are disposed on the same side of the pressure regulating piston.

3. The pressure regulating valve as claimed in claim 2, wherein
   the first effective pneumatic area and the second effective pneumatic area have the same orientation.

4. The pressure regulating valve as claimed in claim 3, wherein
   the pressure regulating piston includes a radial outer surface including venting channels and guide surfaces.

5. The pressure regulating valve as claimed in claim 4, wherein
   the pneumatic seal is an O-ring or a vulcanized sealing ring.

6. The pressure regulating valve as claimed in claim 5, further comprising:
   a multi-part seal between the at least one wall of the at least one first pressure regulating chamber and the pressure regulating piston.

7. The pressure regulating valve as claimed in claim 6, wherein
   the multi-part seal includes at least one outer ring and at least one inner ring.

8. The pressure regulating valve as claimed in claim 7, wherein
   the at least one outer ring is a hard sealing ring and the at least one inner ring is an elastic sealing ring.

9. The pressure regulating valve as claimed in claim 8, wherein
   the hard sealing ring is one or more of a Teflon and a plastic ring, and
   the inner ring is an O-ring.

10. The pressure regulating valve as claimed in claim 9, wherein
    the O-ring is a silicon or rubber O-ring.

11. The pressure regulating valve as claimed in claim 7, wherein
    the pressure regulating piston includes a radial groove configured to receive the multi-part seal.

12. The pressure regulating valve as claimed in claim 11, wherein
    the radial groove includes a pneumatic connection in the base of the groove configured to permit fluid communication between the at least one first pressure regulating chamber and the radial groove.

13. The pressure regulating valve as claimed in claim 12, wherein
    the pneumatic connection is disposed such that when the pressure regulating valve is in an installed state, pressure from the at least one first pressure regulating chamber is applicable to press the multi-part seal radially outwards.

14. The pressure regulating valve as claimed in claim 1, wherein
    the pressure regulating piston is formed in one piece.

* * * * *